July 25, 1933.  J. M. LARSON  1,919,337
THERMOSTATIC CONTROLLER
Filed Sept. 12, 1930   3 Sheets-Sheet 1
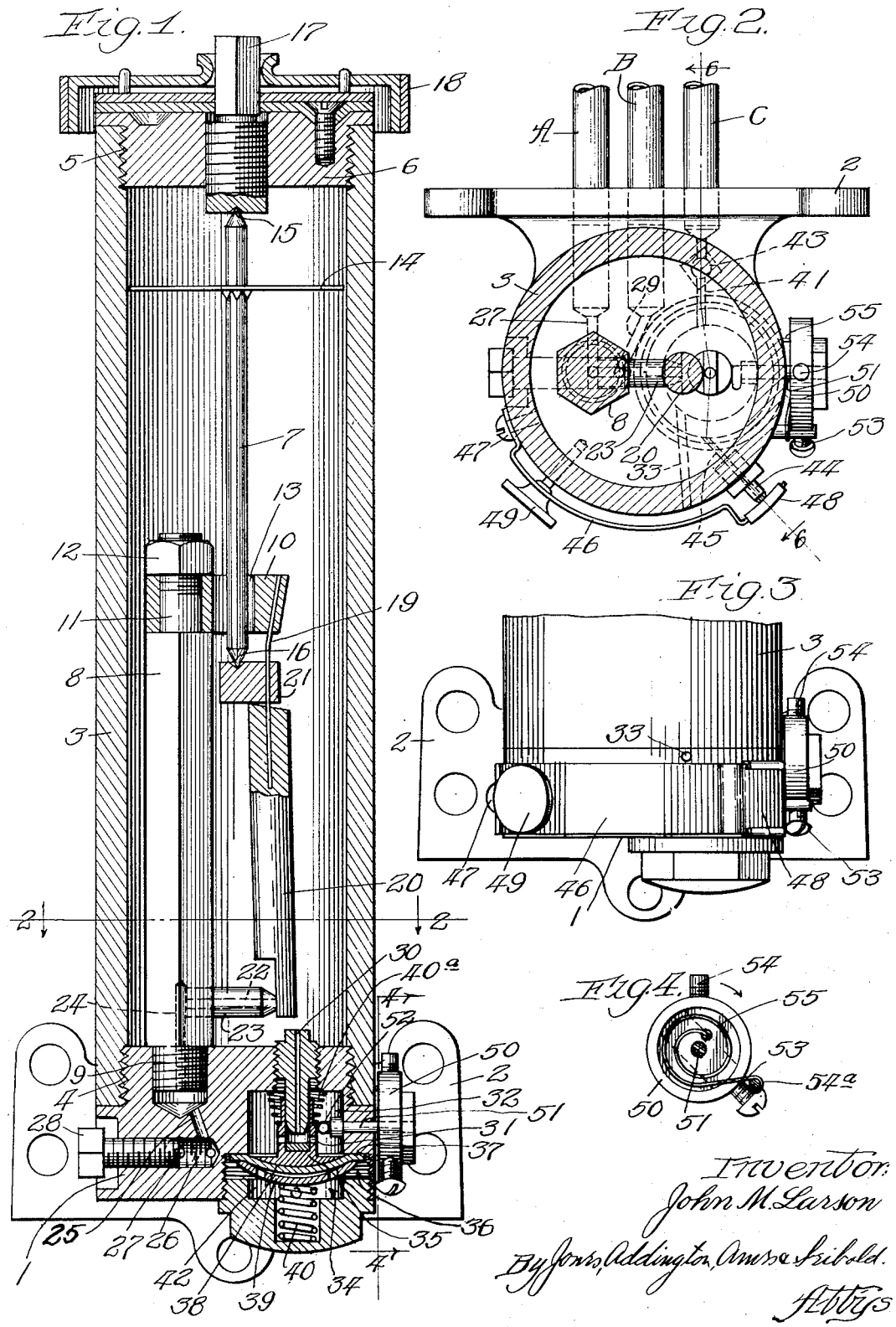

July 25, 1933. J. M. LARSON 1,919,337
THERMOSTATIC CONTROLLER
Filed Sept. 12, 1930 3 Sheets-Sheet 2
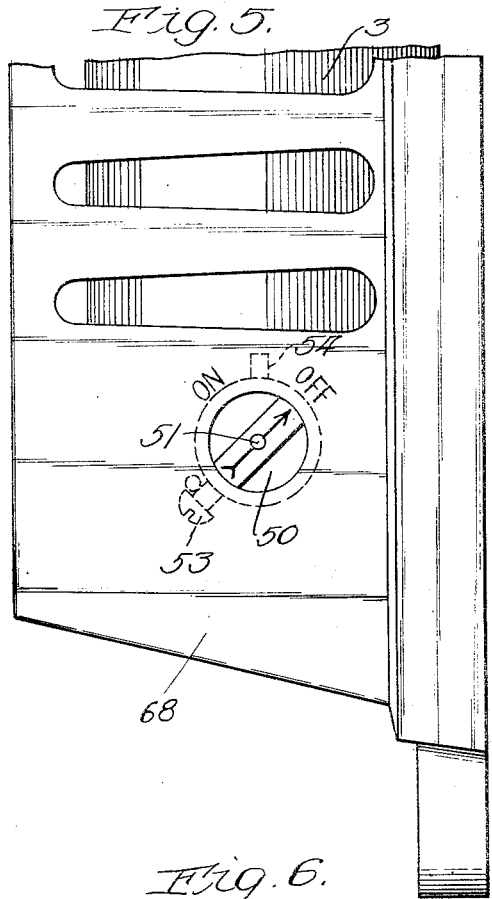
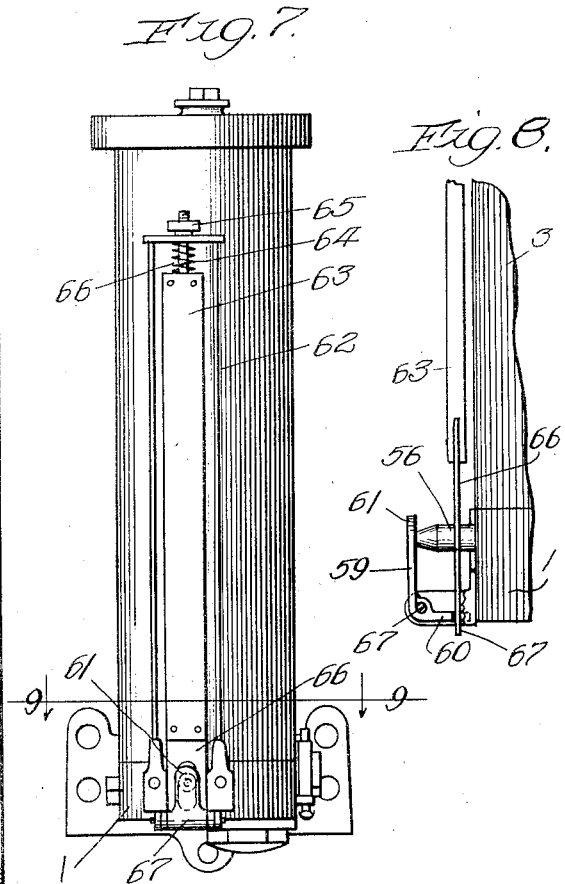
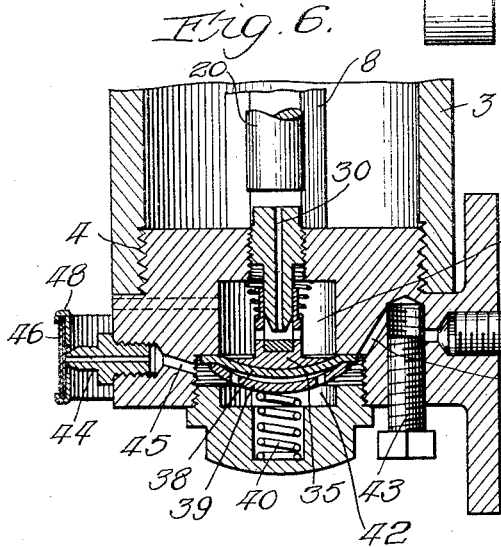
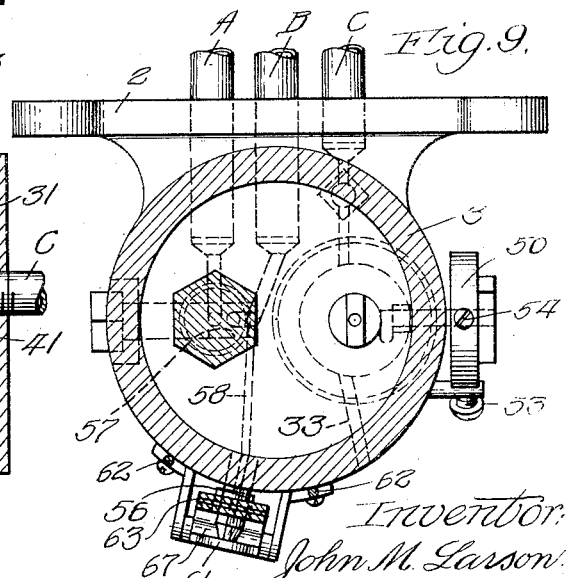
Inventor:
John M. Larson

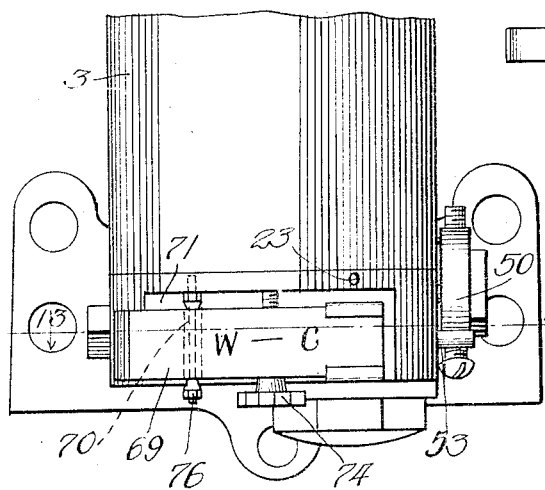
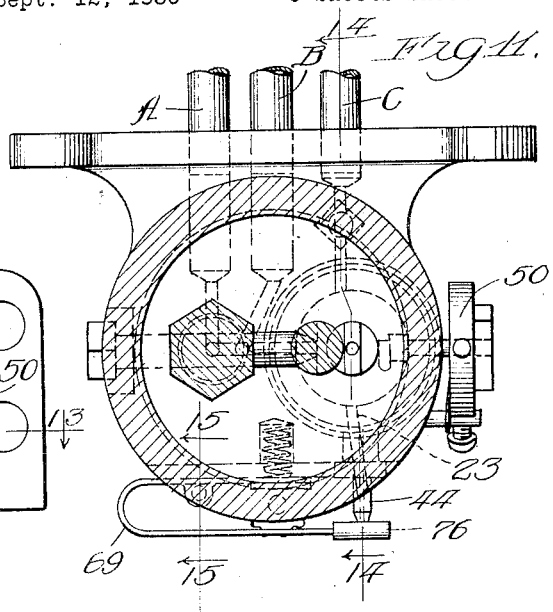
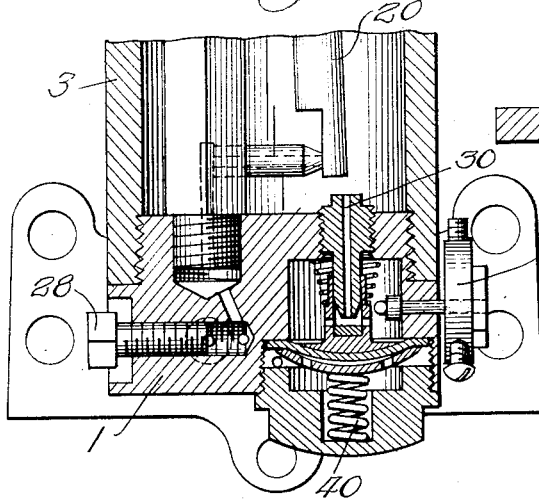
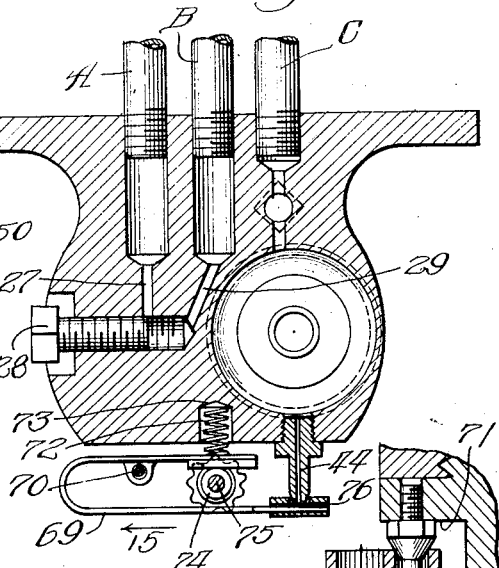
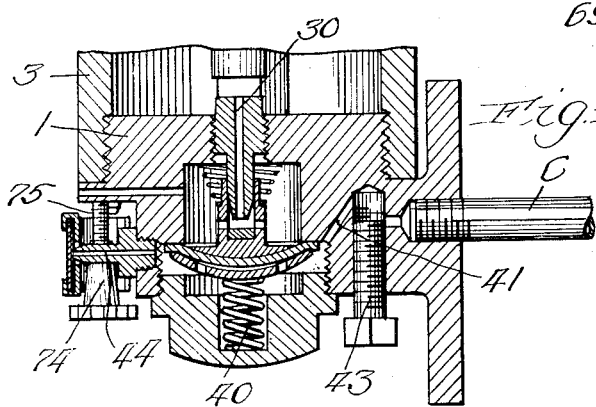
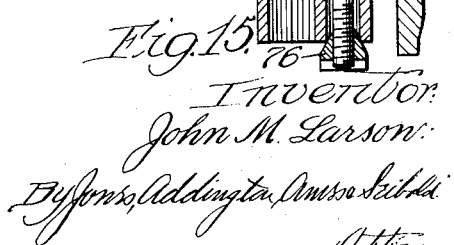

Patented July 25, 1933

1,919,337

UNITED STATES PATENT OFFICE

JOHN M. LARSON, OF CHICAGO, ILLINOIS, ASSIGNOR TO NATIONAL REGULATOR COMPANY, OF CHICAGO, ILLINOIS, A CORPORATION OF ILLINOIS

THERMOSTATIC CONTROLLER

Application filed September 12, 1930. Serial No. 481,450.

This invention relates to a thermostatic controller and has special reference to thermostatic means for controlling the pressure in pressure-operated radiator valves.

More particularly, this invention relates to a fluid pressure-operated thermostatic controller, having high and low temperature level regulating means. All the thermostats in a building are so connected that they may be changed from high to low temperature level regulation and vice versa at a central point; and in case it is desired to maintain a room at normal temperature after the controllers have been set for low level temperature control an adjustment is provided on the thermostat for changing it back to high level temperature control without affecting the temperature of the remainder of the heating system.

An object of this invention is to provide an improved high and low level thermostatic controller operated by fluid pressure which may be changed from high to low temperature control and back again from a central point.

Another object of this invention is to provide an improved device of the above-referred-to type, which, when set for low level temperature control, may be changed back to high level temperature control by local adjustment.

A further object of this invention is to provide a thermostatic controller of the type above referred to, having means thereon for accurately regulating the heat, both at high and low level temperatures.

Further objects of this invention will be apparent from the following description, when taken together with the drawings, in which latter:

Figure 1 is a vertical cross-sectional view, partially in elevation, of a thermostat embodying the present invention;

Fig. 2 is a horizontal cross-sectional view taken on the line 2—2 of Fig. 1;

Fig. 3 is a side elevational view of the lower portion of the thermostat showing the thermally operated valve control;

Fig. 4 is a cross-sectional view taken on the line 4—4 of Fig. 1, showing the locally positioned means for changing the thermostat from low to high level control;

Fig. 5 is a partial side elevational view of the thermostat with a casing mounted thereon;

Fig. 6 is a cross-sectional view of the lower portion of the thermostat taken on the line 6—6 of Fig. 2;

Fig. 7 is a side elevation of another form of thermostat embodying the present invention;

Fig. 8 is a side elevational view of an exhaust valve and the means for controlling the same employed in the construction shown in Fig. 7;

Fig. 9 is a horizontal cross-sectional view taken on the line 9—9 of Fig. 7;

Fig. 10 is a partial side elevational view of still another form of thermostat embodying the present invention;

Fig. 11 is a cross-sectional view partially in elevation taken on the line 11—11 of Fig. 10;

Fig. 12 is a vertical cross-sectional view partially in elevation of the device shown in Fig. 10;

Fig. 13 is a cross-sectional view taken on the line 13—13 of Fig. 10;

Fig. 14 is a cross-sectional view taken on the line 14—14 of Fig. 11; and

Fig. 15 is a sectional view taken on the line 15—15 of Fig. 11.

Referring more particularly to the drawings, and first to Figs. 1 to 6, inclusive, the construction shown comprises a base member 1, provided with suitable mounting lugs 2. A cylindrical casing 3 may be threaded as at 4 upon the base member 1 and threaded as at 5 to receive a suitable plug member 6. A rod 7 is mounted within the cylindrical casing 3. The length of the cylindrical casing varies. A post 8 is threaded at 9 with the base 1, and an arm 10 is mounted on a stud 11 at the upper end of the post, and held thereon by a nut 12.

The arm 10 is provided with the opening 13 to permit the rod 7 to pass therethrough. Intermediate its ends the rod 7 may be provided with a disc 14 for holding the rod in substantially a central position within the casing to facilitate assembly of the parts and to prevent unintended dislocation of the rod 7.

The upper and lower ends of the rod 7 are preferably sharpened to form bearing points 15 and 16 respectively. The point 15 is adapted to be received in the lower end of an adjusting screw 17 which in turn is threaded into the upper plug member 6. A suitable dial member 18 may be fixed in respect to the adjusting screw 17. The dial 18 is preferably provided with graduations indicating temperatures at which the thermostatic device is adjusted to operate.

Mounted adjacent the end of the arm 10 is a spring member 19 which is adapted to support a valve member 20 and a lug member 21. The lug member 21, as shown in Fig. 1, is attached at one end to the spring member 19, while its other end serves to support the lower point 16 of the thermostatic rod 7. It will thus be seen that upon contraction of the casing member the valve member 20 will be forced towards the sides of the casing 3 or to the rod, as shown in Fig. 1 of the drawings. The parts are so designed that this will occur upon a drop in temperature.

The valve member 20 normally serves to close the exhaust aperture 22, which is in communication with the source of fluid pressure, in a manner to be hereinafter described. Accordingly, upon a movement to the right of the valve member 20 the pressure medium will be exhausted through the aperture 22 into the interior of the casing 3.

The aperture 22 is formed in a nipple member 23 which may be screw-threaded into the post 8, as shown, with its central opening in communication with a central opening 24 in the post 8. The opening 24 communicates with an opening 25 in the base member 1, while the opening 25 in turn communicates with the reducing valve chamber 26. The fluid pressure for operating the thermostat is supplied under pressure from a central source of supply through the conduit A and an aperture 27 to the reducing valve chamber 26. The size of the aperture 27 may be regulated by an adjustable screw 28. From the reducing valve chamber 26 a passageway 29 leads to the conduit B, which in turn communicates with the pressure-operated radiator valve and supplies the pressure therefor. The adjusting screw 28 not only limits the quantity of fluid which can, in any event, escape through the exhaust aperture 22, but also limits the quantity of fluid admissible to the conduit B.

From the casing 3 exhaust to the atmosphere is permitted through the exhaust outlet 30 and through apertures 31 into a valve chamber 32, and from there to the atmosphere through the passageway 33. A valve 34 controls the exhaust of fluid from the interior of the chamber 3. The valve 34 comprises a substantially vertically movable valve member 35, which is positioned in a tapered opening 36 provided in the base member 1. A shoulder 37 is formed at the top of the opening 36 and a circular flexible diaphragm 38 is held in engagement with the shoulder by an inverted dome-shaped washer member 39. The washer member 39 is, in turn, held in place by a spring 40 which is positioned in the base member 1 under the valve member 35.

Another fluid pressure conduit C, which may be connected to the same fluid pressure source as is employed for supplying fluid under pressure through the conduit A, is employed for supplying pressure through the passageway 41 to the pressure chamber 42, which is located under the diaphragm 38. The adjustable screw 43 limits the flow of fluid into the valve pressure chamber 42 when the port 44 is in open position, as shown in Fig. 2 of the drawings. The fluid which is forced into the chamber 3 when the valve 20 is in open position escapes through the exhaust passage 30, as previously described. However, when pressure is supplied to the valve chamber 42 through the conduit C and the passageway 41, the pressure forces up the diaphragm 38, and thereby the valve member 35, so as to close the aperture 30 and prevent the escape of any fluid through the passageway 30 into the valve chamber 32. This, in turn, causes pressure to be built up inside the chamber 3 until the pressure therein is equal to the pressure entering the chamber through the aperture 22 and, consequently, renders the valve 20 inoperative irrespective of the expansion or contraction of the chamber 3. As the increased pressure in the chamber likewise increases the pressure which is supplied to the radiator valve through the conduit B, the radiator valve will be kept closed, thereby preventing further heating of the room in which it is situated.

If no further means were employed for releasing the pressure built up due to the closing of the valve 34, no further heat would be supplied to the room until the valve 34 were opened. In order to permit the escape of pressure so as to relieve the pressure on the radiator valve and allow the same to open, additional means are provided, which means operate as a low temperature level control when the valve 34 is closed.

An exhaust port 44 is in communication with the pressure chamber 42 by means of the passage 45. When the exhaust port 44 is open the pressure which normally holds the valve 34 in closed position is allowed to escape, which permits the valve to open so as to reduce the pressure in the chamber 3 and at the radiator valve. In order to keep the exhaust port 44 closed until the pressure member drops to a predetermined level a thermally operated valve member 46 is employed. One end of the thermostatic valve member, which is preferably of the bimetallic type, is fastened to the base 1 by means of a screw 47, and the other end is provided with a clip 48, which holds a valve facing material which lies adjacent the opening of the exhaust port 44. The thermostatic valve member 46 is so constructed that it will tend to straighten out upon a drop in temperature and to increase the curvature upon a rise in temperature. Therefore, when the temperature reaches a predetermined level, the end 48 of the valve member 46 is moved away from the exhaust port 44, which allows the pressure to escape from the pressure chamber 42, thereby permitting the valve 34 to open. A spring 40$^a$ positioned between the base 1 and the valve member 35 returns the valve to high temperature position upon the reduction of pressure in the pressure chamber 42.

A thumb screw 49 extends through an opening in the valve member 46 intermediate the ends thereof and is screw threaded into the base 1 so as to act as an adjusting means for the valve member 46. In the construction shown and described, tightening the thumb screw 49 maintains the end 48 of the valve member 46 in normal, closed position until there is a greater drop in temperature, and loosening the thumb screw 49 permits the end 48 to be moved away from the port 44 upon a lesser drop in temperature.

As previously explained, the conduit C is connected to a source of fluid pressure which may supply all the thermostats in a building. With this construction a valve may be placed at a central point which, when open, causes the fluid under pressure to flow to all of the thermostats and causes the valve 34 in each to close, thereby changing the thermostats from high temperature level control to low temperature level control. Any means may be employed for allowing the fluid under pressure to flow through the conduits C, such as a hand valve, which may be operated by a janitor, for instance, or, if desirable, time controlled mechanism may be used for this purpose.

After the thermostats have been changed from high temperature level control to low temperature level control by forcing fluid under pressure into the pressure chambers 42, which would be done when the room was unoccupied, as at night, it may sometimes be desirable to heat up one of the rooms. For this reason locally adjustable means are provided on the thermostats. These means may take the form of an operating button, as at 50, which is mounted upon a shaft 51 journalled into the base 1 and extending into the valve chamber 32. The inner end of the shaft 51 is preferably provided with a cam member 52, which, when the operating button is turned, engages the valve member 35 and pushes the valve downwardly to open position, thereby returning the apparatus to high temperature level control. Stop members 53 and 54 are provided on the periphery of the operating button 50, which limit the rotation of the operating button in either direction by engaging a stop 54$^a$. A spring member 55 normally holds the operating button 50 in inoperative position so that the cam member 52 does not engage the valve member 35. When the operating button is rotated in the direction of the arrow, as shown in Fig. 4, the cam member 52 frictionally engages the top of the valve member 35 and is thereby maintained in this position where it will remain until manually returned to normal operative position, or until the engineer's valve controlling the conduit C is operated to shift the regulation back to the normal temperature level.

It is to be noted that instead of the means just described, any other means for releasing the pressure at the radiator valve may be employed as a low temperature level control. Another form of means for so doing is shown in Figs. 7, 8 and 9. This construction only differs from that previously described in that the airport 44 and the communicating passageway 45, which connect the pressure chamber 42 with the outer air, are done away with, as well as the thermostatic means for controlling the same. Instead of this, an exhaust port 56 is connected to the reducing valve chamber 57 by means of a passageway 58. The exhaust port 56 is controlled by a bell crank-shaped valve member 59, which is preferably pivotally mounted below the exhaust port 56, so that when the end of the horizontally extending portion 60 is moved downwardly the vertically extending portion 61 closes the exhaust port 56. In order to actuate the valve member 60 supporting member 62 are secured adjacent their lower ends to the base 1. A thermally expansible and contracting actuating arm 63, having a threaded rod 64 at the upper end thereof, is suspended from the upper end of the thermally operated member 62 by means of a nut 65 which is threaded onto the end of the rod 64 extending upwardly through the member 62$^a$ which connects the upper ends of the supporting members 62. A spring 66 is positioned between the upper end of the member 62 and the actuating bar 63 to allow for the extra expansion of the bar when the device is set for low to high temperature level regulation. The lower end 66 of the bar 63 is provided with a slot through which the exhaust port 56 extends and is provided with a reduced portion 67 at the lower end, which fits into an aperture provided therefor in the end 60 of the valve 59. With this construction, when the bar 63 contracts, due to a drop in temperature, the end 61 of the valve 59 is permitted to swing away from the exhaust port 56 and permits the escape of pressure from the radiator valve through the conduit B and thereby prevents the temperature from dropping below a predetermined level.

A suitable casing 68, as shown in Fig. 5, may be positioned about the thermostat so as to protect the same.

The construction shown in Figs. 10 to 15, inclusive, is substantially the same as that shown in Figs. 1 to 6, inclusive, except as to the thermostatic valve mechanism for controlling the exhaust port 44. This thermostatic valve construction comprises a U-shaped bimetallic element 69 adjustably mounted on a pivot pin 70 threaded into a shoulder 71 on the base 1, a coil spring 72 seated in a recess 73 in the base 1 and bearing against the end of the thermostatic element 69, and a cone-shaped adjusting nut 74, the cone portion of which bears against the end of the U-shaped member 69 in opposition to the coil compression spring 72, this cone-shaped nut being threaded on a stud 75 secured in the shoulder of the base. The thermostatic element 69 may be held in place on the pivot pin 70 by means of a nut 76 threaded onto the lower end of this pivot pin. The bimetallic element itself is, of course, springy, and by screwing the cone-shaped nut 74 up or down on its stud 75 the spring pressure of the valve portion 76 of the thermostatic element against the tip of the exhaust port 44 may be regulated so as to determine the temperature at which this low level temperature controlling thermostat valve will open.

While I have shown and described but three embodiments of the present invention, it will be apparent to those skilled in the art that various modifications thereof may be made without departing from the spirit and scope of this invention and, therefore, I wish to be limited only by the scope of the prior art and the appended claims.

I claim:

1. A thermostatic controller comprising a sealed thermally expansible and contractible chamber, a fluid pressure inlet duct in said chamber, a valve operated by the expansion and contraction of said chamber for controlling the inlet duct, an outlet duct in said chamber connecting the interior of said chamber with the outer air, a fluid pressure operable valve controlling said outlet duct, a second outlet duct for permitting the escape of fluid from said pressure operable valve, and a thermally operated valve for controlling said second outlet duct whereby when the thermally controlled valve is in open position the fluid is allowed to escape from said pressure operable valve thereby permitting the same to open.

2. A thermostatic controller comprising a sealed thermally expansible and contractible chamber, a fluid pressure inlet duct in said chamber, a valve operated by the expansion and contraction of said chamber for controlling the inlet duct, an outlet duct in said chamber connecting the interior of said chamber with the outer air, a fluid pressure operable valve controlling said outlet duct and having a pressure chamber, a second outlet duct connecting said pressure chamber with the outer air, and a thermally operated valve for controlling said second outlet duct whereby when the thermally operated valve is in open position the fluid is allowed to escape from said pressure chamber thereby permitting the pressure operable valve to open.

3. A thermostatic controller comprising a sealed thermally expansible and contractible chamber, a fluid pressure inlet duct in said chamber, a valve operated by the expansion and contraction of said chamber for controlling the inlet duct, and outlet duct in said chamber connecting the interior of said chamber with the outer air, a fluid pressure operable valve controlling said outlet duct, a second outlet duct connecting said pressure operable valve with the outer air, and a thermally operated bimetallic member adapted to open and close said second outlet duct whereby when the bimetallic member is in open position the fluid is allowed to escape from said pressure operable valve thereby permitting the same to open.

4. Thermostatic means for controlling the pressure in a pressure operated radiator valve comprising means for supplying a fluid under pressure to said valve, thermostatic means for maintaining normal temperature level comprising a sealed thermally expansible and contractible chamber, and a valve operated by the expansion and contraction of said chamber for controlling the exhaust or fluid from said supply means, an outlet duct connecting the interior of said chamber with the outer air, a valve for controlling said outlet duct, a second outlet duct connecting said supply means with the outer air, and a thermally operated exhaust valve for controlling said second outlet duct whereby the pressure at the radiator is controlled to maintain a lower temperature level.

5. A thermostatic controller comprising a sealed thermally expansible and contractible chamber, a fluid pressure inlet duct in said chamber, a valve operated by the expansion and contraction of said chamber for controlling the inlet duct, an outlet duct in said chamber connecting the interior of said chamber with the outer air, a fluid pressure operable valve controlling said outlet duct, a second outlet duct connecting said pressure inlet duct with the outer air, a valve for controlling said second outlet duct and a thermally expansible and contractible element for operating said last mentioned valve to permit the reduction of pressure in said inlet duct when said pressure operable valve is closed.

6. A thermostatic controller comprising a sealed thermally expansible and contractible chamber, a fluid pressure inlet duct in said chamber, a valve operated by the expansion and contraction of said chamber for controlling the inlet duct, an outlet duct in said chamber connecting the interior of said chamber with the outer air, a fluid pressure operable valve controlling said outlet duct, a second outlet duct connecting said pressure inlet duct with the outer air, a pivotally mounted bell-crank shaped valve for controlling said second outlet duct and a thermally expansible and contractible element for pivoting said last mentioned valve to permit the reduction of pressure in said inlet duct when said pressure operable valve is closed.

7. A thermostatic controller comprising a sealed thermally expansible and contractible chamber, a fluid pressure inlet duct in said chamber, a valve operated by the expansion and contraction of said chamber for controlling the inlet duct, an outlet duct in said chamber connecting the interior of said chamber with the outer air, a valve for controlling said outlet duct, means for operating said valve, a second outlet duct connecting said pressure inlet duct with the outer air, a pivotally mounted bell-crank shaped valve for controlling said second outlet duct, a thermally expansible element fastened adjacent the lower end and arranged in a substantially vertical position, a downwardly extending arm secured to the thermally expansible element adjacent the upper end and engaging said bell-crank shaped valve to operate the same to permit the reduction of pressure in said inlet duct when said valve for controlling the first mentioned outlet duct is closed.

8. Thermostatic means for controlling the pressure in a pressure operated radiator valve comprising means for supplying fluid under pressure to said valve, means for restricting said supply, thermostatic means for maintaining normal temperature level comprising valve means for controlling the exhaust of fluid on the low pressure side of said restricting means, means for rendering said exhaust valve ineffective to exhaust fluid comprising a pressure controlled valve, manual means for forcing said pressure controlled valve open against the pressure acting thereon, and thermostatic means for controlling the pressure acting on said valve.

9. Thermostatic means for controlling the pressure in a pressure operated radiator valve comprising means for supplying fluid under pressure to said valve, means for restricting said supply, thermostatic means for maintaining normal temperature level comprising valve means for controlling the exhaust of fluid on the low pressure side of said restricting means, means for rendering said exhaust valve ineffective to exhaust fluid comprising a pressure controlled valve, and thermostatic means for controlling the pressure acting on said valve.

10. A thermostatic controller comprising a sealed thermally expansible and contractible chamber, a fluid pressure inlet duct in said chamber, a valve operated by the expansion and contraction of said chamber for controlling the inlet duct, an outlet duct in said chamber controlled by a fluid pressure operable valve, a second outlet duct connecting said pressure inlet duct with the outer air, and controlled by a valve, and a thermally expansible and contractible element for operating said last mentioned valve to provide for low temperature regulation, said element being resiliently secured at one end to provide for expansion of the same when the temperature is above low level control temperature.

11. Thermostatic means for controlling a pressure operated radiator valve comprising a thermal expansible and contractible chamber, a restricted fluid pressure inlet passage leading to the pressure-operated valve, a port in said chamber for venting said restricted passage, a valve operated by the expansion and contraction of the chamber for controlling said port, an exhaust passage from said chamber for the fluid, a valve for controlling said exhaust passage, fluid pressure means for operating said exhaust valve, and thermostatic valve means for controlling said fluid pressure means.

12. Thermostatic means for controlling a pressure operated radiator valve comprising a thermal expansible and contractible chamber, a restricted fluid pressure inlet passage leading to the pressure-operated valve, a port in said chamber for venting said restricted passage, a valve operated by the expansion and contraction of the chamber for controlling said port, an exhaust passage from said chamber for the fluid, a valve for controlling said exhaust passage, and additional thermostatic valve means for controlling the pressure in said restricted passage, said expansible chamber comprising a tube and a plug closing one end thereof, said exhaust passage and restricted passage being formed in said plug, and said additional thermostatic means being mounted on said plug.

J. M. LARSON.